United States Patent
Artemov et al.

(10) Patent No.: US 12,375,455 B2
(45) Date of Patent: Jul. 29, 2025

(54) ENABLING AND DISABLING END-TO-END ENCRYPTION IN MULTIPARTY CONFERENCE

(71) Applicant: RingCentral, Inc., Belmont, CA (US)

(72) Inventors: Danil Artemov, Saint Petersberg (RU); Daniel Fishkov, San Jose, CA (US); Lev Rosenblit, Shoam (IL)

(73) Assignee: RingCentral, Inc., Belmont, CA (US)

( * ) Notice: Subject to any disclaimer, the term of this patent is extended or adjusted under 35 U.S.C. 154(b) by 292 days.

(21) Appl. No.: 17/837,462

(22) Filed: Jun. 10, 2022

(65) Prior Publication Data

US 2023/0188509 A1 Jun. 15, 2023

Related U.S. Application Data

(63) Continuation of application No. PCT/RU2021/000570, filed on Dec. 14, 2021.

(51) Int. Cl.
*H04L 9/40* (2022.01)
*H04L 65/403* (2022.01)

(52) U.S. Cl.
CPC .......... *H04L 63/0428* (2013.01); *H04L 63/06* (2013.01); *H04L 63/108* (2013.01); *H04L 65/403* (2013.01)

(58) Field of Classification Search
CPC ... H04L 63/0428; H04L 63/06; H04L 63/108; H04L 65/403
See application file for complete search history.

(56) References Cited

U.S. PATENT DOCUMENTS

| | | | | |
|---|---|---|---|---|
| 10,666,693 | B1* | 5/2020 | Kret | H04L 12/1822 |
| 2009/0094671 | A1* | 4/2009 | Kurapati | H04L 63/1458 726/1 |
| 2013/0136261 | A1* | 5/2013 | Guo | H04W 12/033 380/270 |
| 2019/0036888 | A1* | 1/2019 | Pularikkal | H04L 63/0236 |
| 2020/0259640 | A1* | 8/2020 | Leavy | H04L 9/0841 |
| 2022/0360589 | A1* | 11/2022 | Muscariello | H04L 9/0836 |
| 2022/0376895 | A1* | 11/2022 | Booth | H04L 9/3247 |
| 2022/0377057 | A1* | 11/2022 | Lyons | H04L 63/062 |

(Continued)

OTHER PUBLICATIONS

Isobe, Takanori; Ito, Ryoma; "Security Analysis of End-to-End Encryption for Zoom Meetings," IEEE, Jun. 23, 2021, IEEE Access, vol. 9, pp. 90677-90689.*

(Continued)

*Primary Examiner* — Victor Lesniewski

(57) ABSTRACT

A computer-implemented method for dynamically disabling an end-to-end encryption session within an online meeting session is provided. The method comprises engaging in an online meeting session in which an end-to-end encryption session is enabled. The method further comprises sending, to a key orchestration server, a first encrypted message in which the contents of the first encrypted message are instructions to disable the end-to-end encryption session. The method further comprises receiving, from the key orchestration server, a second encrypted message that indicates that a participant has initiated disabling of the end-to-end encryption session. In response to receiving the second encrypted message disabling the end-to-end encryption session while maintaining the online meeting session.

19 Claims, 10 Drawing Sheets

(56) References Cited

U.S. PATENT DOCUMENTS

| | | | | |
|---|---|---|---|---|
| 2022/0377059 A1* | 11/2022 | Lyons | ................... | H04L 9/40 |
| 2023/0123475 A1* | 4/2023 | Johnson | ............. | H04L 63/1466 |
| | | | | 726/2 |
| 2023/0224286 A1* | 7/2023 | Krohn | .................. | H04L 63/061 |
| | | | | 713/164 |
| 2024/0275918 A1* | 8/2024 | Ling | ................... | H04L 65/403 |

OTHER PUBLICATIONS

Sudozai, M.A.K.; Saleem, Shahzad; "Profiling of secure chat and calling apps from encrypted traffic," 15th International Bhurban Conference on Applied Sciences and Technology (IBCAST), Islamabad, Pakistan, Jan. 2018, pp. 502-508.*

Prabhune, Samira; Sharma, Sonal; "End-to-End Encryption for Chat App with Dynamic Encryption Key," 3rd International Conference on Advances in Computing, Communication Control and Networking (ICAC3N), Greater Noida, India, 2021, pp. 1361-1366.*

* cited by examiner

ENABLING AND DISABLING END-TO-END ENCRYPTION IN MULTIPARTY CONFERENCE

BENEFIT CLAIM

This application claims the benefit of priority under 35 U.S.C. § 120 from Patent Cooperation Treaty (PCT) application PCT/RU2021/000570, filed Dec. 14, 2021, the entire contents of which is hereby incorporated by reference as if fully set forth herein.

TECHNICAL FIELD

The present disclosure relates generally to the field of end-to-end encryption. Specifically, the present disclosure relates to systems and methods for securely enabling and disabling end-to-end encryption during an online meeting between multiple participants.

BACKGROUND

Online meetings have become an essential part of everyday lives. For example, businesses use online meetings to discuss sensitive business matters, students use online meetings to exchange personal ideas and information, and friends and/or relatives use online meetings to engage in private conversations. Data encryption may be implemented by online meeting providers, such as third-party meeting applications, to ensure that the content shared during the online meeting is kept safe from unauthorized users, such as hackers.

One such data encryption technique is end-to-end encryption. End-to-end encryption is an encryption technique in which data, such as data messages, data frames, or any other unit of data that is packaged and sent from one endpoint to another via a network, are encrypted at an end-user device prior to sending the message to an intended end-user recipient device. Once the end-user recipient device receives the message, the end-user recipient device decrypts the message. End-to-end encryption implements public and private key pairs, where a public key is used by the sender to encrypt the message and the corresponding private key is used by the recipient to decrypt the encrypted message. The public keys are available to each of the end-user devices but, the corresponding private key is only maintained by at the end-user recipient device and is not stored in a centralized location such as an online meeting server. If the encrypted message is intercepted by an unauthorized user in transit, the unauthorized user is unable to decrypt the message as the unauthorized user does not have access to the corresponding keys.

However, there are some instances in which an end-to-end encryption session for an online meeting may need to be dynamically disabled during the meeting. For example, if a new participant joins an online meeting using a device that is not equipped with end-to-end encryption functionality, then the new participant may not be able to receive readable messages as the new participant will have no method for decrypting incoming messages. One such example of a device that is not equipped with end-to-end encryption is a dial-in phone. In another example, recording the online meeting and storing the recording in cloud storage does not support end-to-end encryption. As a result, end-to-end encryption for the online meeting session would have to be disabled in order for the new participant, using a dial-in phone, to contribute to the online meeting or to enable cloud recording of the online meeting. The ability to dynamically disable end-to-end encryption for an online meeting session may allow unauthorized users an opportunity to access confidential information that would otherwise be encrypted. Disabling end-to-end encryption is initiated by an end-user sending a message to the online meeting server. That message may be intercepted and/or spoofed by an unauthorized server. For example, an unauthorized user may spoof a disable end-to-end encryption message and send the spoofed message to the online meeting server. The online meeting server may then send disable messages to each of the participants, resulting in each participant erroneously turning off encryption. With encryption disabled, unauthorized users may be able to intercept and view meeting messages between participants.

Therefore, there is a need for an improved encryption control for online meeting sessions.

SUMMARY

The appended claims may serve as a summary of the invention.

DETAILED DESCRIPTION

Figure 1:
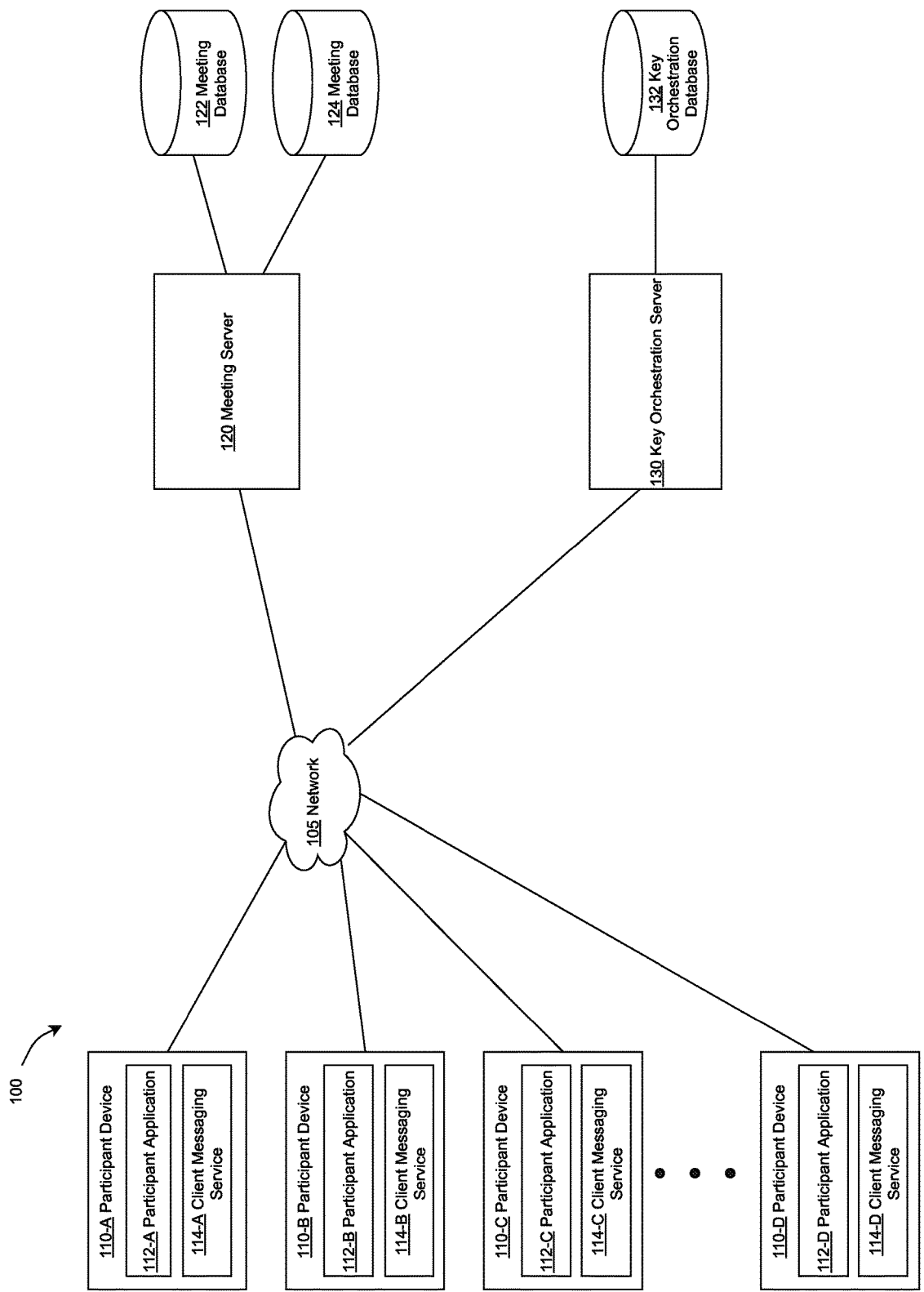
FIG. 1 is a network diagram depicting an online meeting system, in an example embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:

1.0 GENERAL OVERVIEW
   2.0 STRUCTURAL OVERVIEW
      2.1 PARTICIPANT DEVICES
      2.2 NETWORK
      2.3 MEETING SERVER
      2.4 KEY ORCHESTRATION SERVER
      2.5 COMPUTER HARDWARE OVERVIEW
   3.0 FUNCTIONAL OVERVIEW
   4.0 PROCEDURAL OVERVIEW
      4.1 DISABLING END-TO-END ENCRYPTION
      4.2 DISABLING END-TO-END ENCRYPTION WITH THREE OR MORE PARTICIPANT DEVICES

4.3 ENABLING END-TO-END ENCRYPTION
5.0 AUTHORIZATION TO ENABLE/DISABLE END-TO-END ENCRYPTION

1.0 General Overview

Traditionally, end-to-end encryption provides a superior level of security for an online meeting because in end-to-end encryption, the encryption and decryption steps occur at end-user devices, thereby eliminating the threat of an unauthorized user accessing decryption keys in transit or from a centralized server. However, security vulnerabilities exist when end-to-end encryption is dynamically disabled or enabled during the online meeting session. For example, unauthorized users may spoof system messages used to either enable or disable end-to-end encryption. By spoofing such system messages, unauthorized users may be able to cause end-user devices to either disable end-to-end encryption prematurely or cause end-user devices to think that they are communicating in an end-to-end encryption session when they are not; thereby causing an online meeting session to become unsecure.

The presently described approaches seek to address this security issue by implementing an encrypted process for dynamically enabling and disabling an end-to-end encryption session. The current disclosure provides a technical solution to the technical problem of dynamically enabling and disabling an end-to-end encryption session during an online meeting session. Specifically, the technical solution involves using encrypted messages distributed to end-user participant devices for the purposes of coordinating the disabling or enabling of an end-to-end encryption session. The encrypted messages are only able to be decrypted using software implemented on the end-user participant devices, thereby removing reliance on any third-party server device to initiate either disabling or enabling of an end-to-end encryption session. By removing reliance on any server-side device, unauthorized users will not know when to send spoofed and/or fake messages because the unauthorized users do not know when an end-user participant device initiates disabling or enabling of an end-to-end encryption session and as a result it will be more difficult for unauthorized users to spoof system messages for the purposes of disrupting the end-to-end encryption session.

A computer-implemented method for dynamically enabling and disabling end-to-end encryption within an online meeting session is provided. In an embodiment, the method comprises engaging in an online meeting session in which an end-to-end encryption session is enabled. The method further comprises sending, to a key orchestration server, a first encrypted message, where the first encrypted message is a message to disable the end-to-end encryption session. The method further comprises receiving, from the key orchestration server, a second encrypted message that indicates that a participant device has initiated disabling of the end-to-end encryption session. The method further comprises, in response to receiving the second encrypted message, disabling the end-to-end encryption session while maintaining the online meeting session.

A non-transitory computer-readable medium storing a set of instructions is also provided. In an embodiment, when the set of instructions are executed by a processor the set of instructions cause: engaging in an online meeting session in which an end-to-end encryption session is enabled; sending, to a key orchestration server, a first encrypted message, wherein the first encrypted message is a message to disable the end-to-end encryption session; receiving, from the key orchestration server, a second encrypted message, wherein the second encrypted message indicates that a participant has initiated disabling of the end-to-end encryption session; and in response to receiving the second encrypted message, disabling the end-to-end encryption session while maintaining the online meeting session.

A network-based computer system for dynamically enabling and disabling end-to-end encryption within an online meeting session is also provided. The system comprises a processor and a memory operatively connected to the processor. The memory stores instructions that, when executed by the processor, cause: engaging in an online meeting session in which an end-to-end encryption session is enabled; sending, to a key orchestration server, a first encrypted message, wherein the first encrypted message is a message to disable the end-to-end encryption session; receiving, from the key orchestration server, a second encrypted message, wherein the second encrypted message indicates that a participant has initiated disabling of the end-to-end encryption session; and in response to receiving the second encrypted message, disabling the end-to-end encryption session while maintaining the online meeting session.

2.0 Structural Overview

FIG. 1 is a network diagram depicting an online meeting system 100 in which various implementations, as described herein, may be practiced. The online meeting system 100 enables a plurality of participants to engage in an online meeting session in which end-to-end encryption may be enabled and disabled during the online meeting session. In some examples, one or more components of the online meeting system 100, including participant devices 110-A, 110-B, 110-C, 110-D, a meeting server 120, and a key orchestration server 130 may be used to implement computer programs, applications, methods, processes or other software to perform the described techniques and to realize the structures described herein. In an embodiment, the online meeting system 100 comprises components that are implemented at least partially by hardware at one or more computing devices, such as one or more hardware processors executing program instructions stored in one or more memories for performing the functions described herein.

As shown in FIG. 1, the online meeting system 100 includes one or more participant devices 110-A, 110-B, 110-C, 110-D, a network 105, a meeting server 120, meeting databases 122, 124, a key orchestration server 130, and a key orchestration database 132.

2.1 Participant Devices

Participant devices 110-A, 110-B, 110-C, 110-D are configured to execute one or more participant applications 112-A, 112-B, 112-C, 112-D that are configured to enable communication between the participant devices 110-A, 110-B, 110-C, 110-D, and the meeting server 120. In some embodiments, the participant applications 112-A, 112-B, 112-C, 112-D may be web-based applications that enable connectivity through a browser, such as through Web Real-Time Communications (WebRTC). In other embodiments, the participant applications 112-A, 112-B, 112-C, 112-D may represent a standalone application. The meeting server 120 may be configured to execute server applications, such as server a back-end application that facilitates communication and collaboration between the meeting server 120 and the participant devices 110-A, 110-B, 110-C, 110-D.

In an embodiment, participant devices 110-A, 110-B, 110-C, 110-D may be configured to execute one or more client messaging services 114-A, 114-B, 114-C, 114-D that are configured to generate, send, and receive messages to and from the key orchestration server 130 and the meeting server 120. The client messaging services 114-A, 114-B, 114-C, 114-D are communicatively coupled to the corresponding participant applications 112-A, 112-B, 112-C, 112-D, and act as proxies for creating and handling encrypted messages and routing communication to the key orchestration server 130. For example, from participant application 112-A a WebSocket connection may be established between the participant application 112-A and the client messaging service 114-A. The client messaging service 114-A may act as a proxy that creates and facilitates communication between the participant application 112-A and the key orchestration server 130. In some embodiments, the client messaging services 114-A, 114-B, 114-C, 114-D are run within the corresponding participant applications 112-A, 112-B, 112-C, 112-D. Embodiments described herein are not limited to WebSocket connections, other types of connections may be established such as a WebRTC connection, any type of HTTP connection, or any other type of connection between computing components. Components and arrangements shown in FIG. 1 are not intended to limit the disclosed embodiments, as the system components used to implement the disclosed processes and features may vary.

In an embodiment, participant devices 110-A, 110-B, 110-C, 110-D may represent a computing device such as a desktop computer, a laptop, a tablet, a smartphone, a smart television, and any other computing device having a display and audio/video capture capabilities. Participant devices 110-A, 110-B, 110-C, 110-D may also include one or more software-based client applications that facilitate communications via instant messaging, text messaging, email, Voice over Internet Protocol (VoIP), video conferences, audio/video streaming, and so forth with one another.

2.2 Network

In an embodiment, the network 105 facilitates the exchange of communication and collaboration of data or any other type of information between participant devices 110-A, 110-B, 110-C, 110-D, the meeting server 120, and the key orchestration server 130. The network 105 may be any type of network that provides communications, exchanges information, and/or facilitates the exchange of data between the meeting server 120, the key orchestration server 130, and participant devices 110-A, 110-B, 110-C, 110-D. For example, the network 105 may represent one or more local area networks (LANs), wide area networks (WANs), metropolitan area networks (MANs), global interconnected internetworks, such as the public internet, public switched telephone networks ("PSTN"), or any other suitable connections or combinations thereof that enable the online meeting system 100 to send and receive information between the components of the online meeting system 100. Each such network 105 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 105 and the disclosure presumes that all elements of FIG. 1 are communicatively coupled via network 105. The network 105 may support a variety of electronic messaging formats, and may further support a variety of services and applications for the participant devices 110-A, 110-B, 110-C, 110-D.

2.3 Meeting Server

In an embodiment, the meeting server 120 is configured to provide online meeting services, such as video conferencing, telephony, messaging, email, file sharing, and any other types of communication between users. The meeting server 120 may be communicatively coupled to meeting databases 122 and 124 for the purposes of storing online meeting data. The meeting databases 122 and 124 may include one or more physical or virtual, structured or unstructured storages. The meeting databases 122 and 124 may be configured to store communication data such as audio, video, text, or any other form of communication data. The meeting databases 122 and 124 may also store security data, such as meeting participant lists, permissions, and any other types of the security data. In an embodiment, each of the meeting databases 122 and 124 may be configured to store different types of encrypted data. For example, the meeting database 122 may be configured to store all unencrypted data associated with an online meeting session, while the meeting database 124 may be configured to store all encrypted data associated with the online meeting session. While the meeting databases 122 and 124 are illustrated as an external devices connected to the meeting server 120, the meeting databases 122 and 124 may also reside within the meeting server 120 as an internal component of the meeting server 120.

2.4 Key Orchestration Server

In an embodiment, the key orchestration server 130 is configured to authenticate participants of an end-to-end encryption session, facilitate delivery of encrypted messages to and from the participant devices 110-A, 110-B, 110-C, 110-D and manage and distribute lists of available participant IDs for participants as well as associated public encryption keys to requesting participants. The key orchestration server 130 may be communicatively coupled to a key orchestration database 132 for the purposes of storing meeting lists, participant IDs, and public encryption keys. The key orchestration database 132 may include one or more physical or virtual, structured or unstructured storages. FIG. 1 depicts the key orchestration database 132 as an external device connected to the key orchestration server 130, however the key orchestration database 132 may also reside within the key orchestration server 130 as an internal component of the key orchestration server 130.

2.5 Computer Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
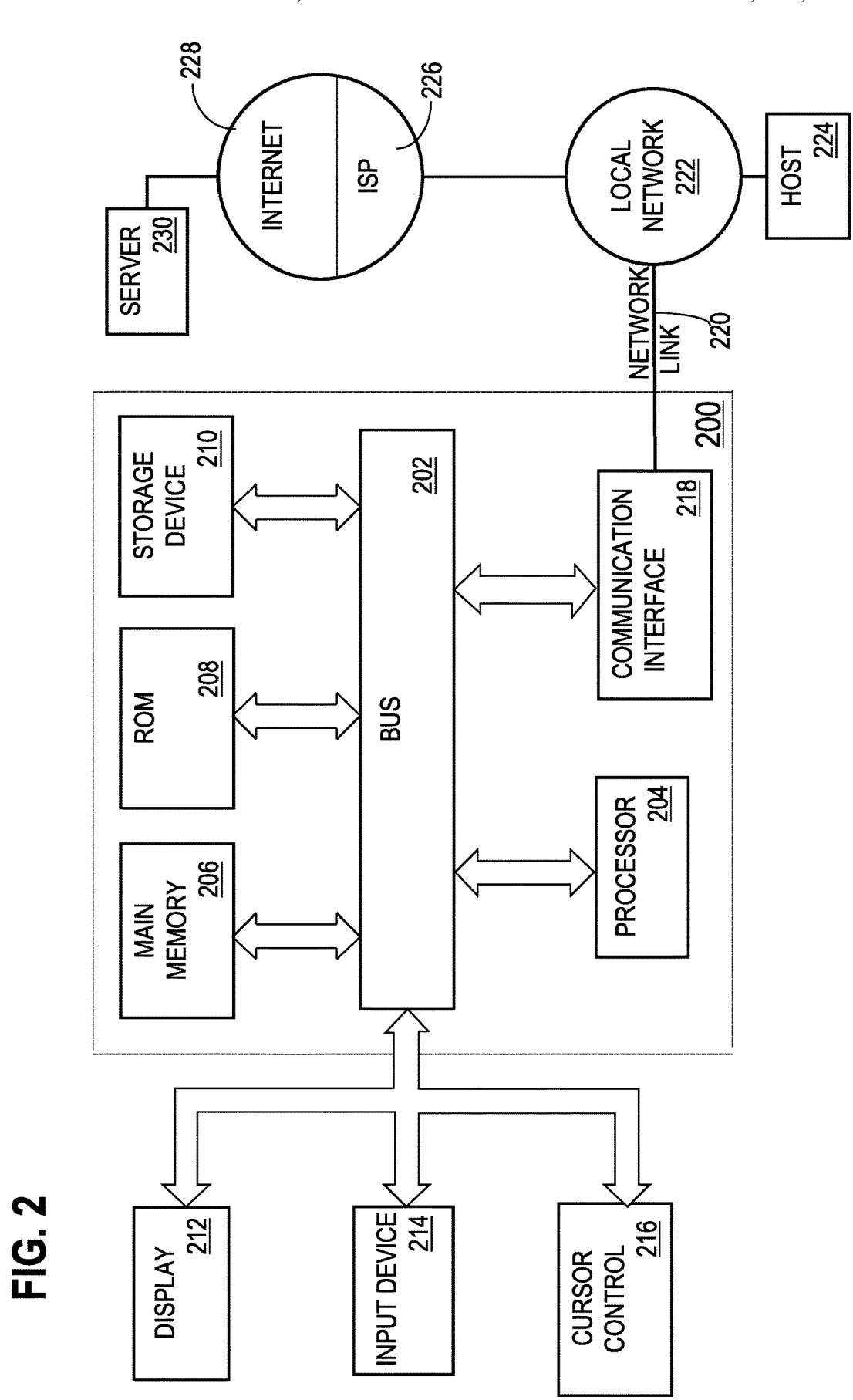
FIG. 2 is a block diagram that depicts an example computer system upon which embodiments may be implemented.

For example, FIG. 2 is a block diagram that illustrates a computer system 200 upon which an embodiment may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

3.0 Functional Overview

Figure 3:
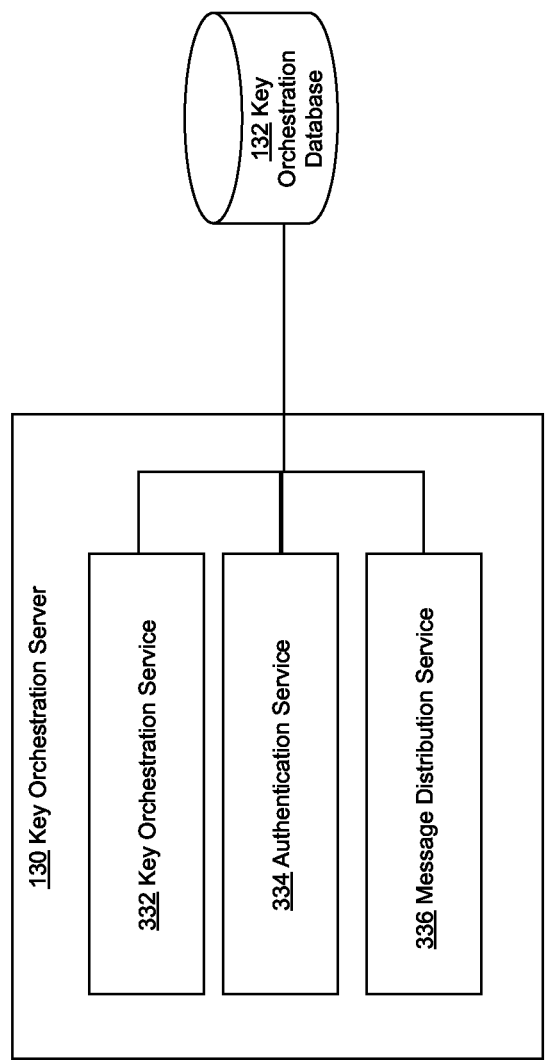
FIG. 3 is a diagram of components of a key orchestration server, in an example embodiment.

FIG. 3 is an expanded diagram of the key orchestration server 130. In an embodiment, the key orchestration server 130 contains sets of instructions, services, or modules which, when executed by one or more processors, perform various functions related to managing encryption keys associated with participants of a group. In FIG. 3, the key orchestration server 130 is configured with a key orchestration service 332, an authentication service 334, and a message distribution service 336. The key orchestration server 130 depicted in FIG. 3 represents just one illustrative example of the key orchestration server 130 and is not intended to be limited to having only the services depicted in FIG. 2. For instance, the key orchestration server 130 may include fewer or additional services and modules not currently shown in FIG. 2.

In an embodiment, the key orchestration service 332 is configured to manage lists of available participant IDs and their corresponding UserInitKeys for each online meeting. A UserInitKey for a particular participant may represent a data object that specifies which ciphersuites the participant supports and a public key for the particular participant. The public key may be used by other participants to encrypt messages intended for the particular participant. The key orchestration service 332 may generate a unique group ID for each meeting. The key orchestration service 332 may store, in the key orchestration database 132, group IDs for online meetings as well as participant information including, but not limited to, participant IDs, participant device IDs, UserInitKeys, and connection information, such as WebSocket connection information.

For example, each online meeting may have a group of authorized participants. As participants join the meeting, each of their participant devices may request to open a connection to the key orchestration server 130. The Key orchestration server 130 may grant the connection and may store, the group ID for the meeting as well as participant information that includes a participant ID, a corresponding participant device ID, the participant's provided UserInitKey, and their connection information. The stored participant information may be used to route encrypted messages to target participants devices using their connection information.

In an embodiment, the key orchestration service 332 is configured to cause a refresh of participant encryption keys periodically. For example, the key orchestration service 332 may be configured to periodically refresh keys for all participants every 2-3 minutes or any other configured duration. Refreshing keys may involve the key orchestration server 130 sending refresh request messages to each of the participant devices 110-A, 110-B, 110-C, 110-D. The participant devices 110-A, 110-B, 110-C, 110-D may then generate a new public-private key pair and send the public key to the key orchestration server 130 for distribution to the other participants.

In another embodiment, the key orchestration service 332 may cause a refresh of participant encryption keys when there is a change to the number of participant's currently engaged in the meeting. For example, if a participant leaves the meeting, the key orchestration service 332 may cause a refresh of participant encryption keys for the remaining participants. Additionally, if a new participant joins the ongoing meeting, the key orchestration service 332 may cause a refresh of participant encryption keys for all active participants. By causing a refresh of encryption keys whenever there is a change to the participant list, the key orchestration service 332 ensures that no participant device may have encryption or decryption capabilities after they have left the meeting or have joined the meeting using an old participant encryption key.

In an embodiment, the authentication service 334 is configured to authenticate connection requests, such as WebSocket connections, from different participant devices. For example, when participant device 110-A requests to open a connection to the key orchestration server 130, the authentication service 334 may verify that the participant using participant device 110-A is authorized to join the current online meeting. The authentication service 334 may connect to the meeting server 120 to retrieve a list of invited participants and then verify whether the participant using participant device 110-A is an invited participant to the meeting. If the participant is an invited participant, then the authentication service 334 triggers the key orchestration service 332 to grant the connection to the participant device 110-A.

In an embodiment, the message distribution service 336 is configured to receive incoming encrypted messages and distribute the incoming encrypted messages to their intended recipients. For example, if participant device 110-A generates an encrypted message for participant 110-B and sends the encrypted message to the key orchestration server 130, the message distribution service 336 may identify participant device 110-B as the intended recipient and may route the encrypted message to participant device 110-B using the connection information maintained by the key orchestration service 332. In another example, participant device 110-A may generate an encrypted message intended for all participant devices in the meeting. The key orchestration server 130 may receive the encrypted message and the message distribution service 336 may identify that all participant devices (e.g., participant devices 110-B, 110-C, 110-D) as the intended recipients. The message distribution service 336 may distribute copies of the encrypted message to participant devices 110-B, 110-C, and 110-D.

In an embodiment, the key orchestration server 130 is configured to implement Message Layer Security (MLS) protocol for end-to-end encrypting messages during the meeting. MLS is designed for passing encrypted messages to a group of participants using a public/private key pair. The MLS protocol ensures confidential and authenticated messages by ensuring that private keys for participant devices 110-A, 110-B, 110-C, 110-D are stored locally. For instance, the private key for participant device 110-A is only stored on participant device 110-A. By only storing the private key for participant device 110-A locally, authorized users cannot intercept participant device 110-A's private key in transit or from the key orchestration server 130. The corresponding public key for participant device 110-A is provided to each of the other participants so that the other participant devices can encrypt messages for another participant device using the other participant device's public key. For example, if participant device 110-B wishes to send an encrypted message to participant device 110-A, then participant device 110-B may use participant device 110-A's public key to encrypt the message. Participant device 110-A, upon receiving the message, would use its own locally stored private key to decrypt the encrypted message. The MLS protocol uses Application Messages, which are system messages, to pass encrypted content between participant devices 110-A, 110-B, 110-C, 110-D. The contents of the Application Messages are not viewable by the key orchestration server 130 or any other device other than the intended recipient.

The key orchestration server 130 is not limited to using the MLS protocol for end-to-end encryption. Other embodiments of the key orchestration server 130 may implement any other end-to-end encryption security protocol for routing encrypted messages between participant devices 110-A, 110-B, 110-C, 110-D.

4.0 Procedural Overview 4.1 Disabling End-to-End Encryption

Figure 4:
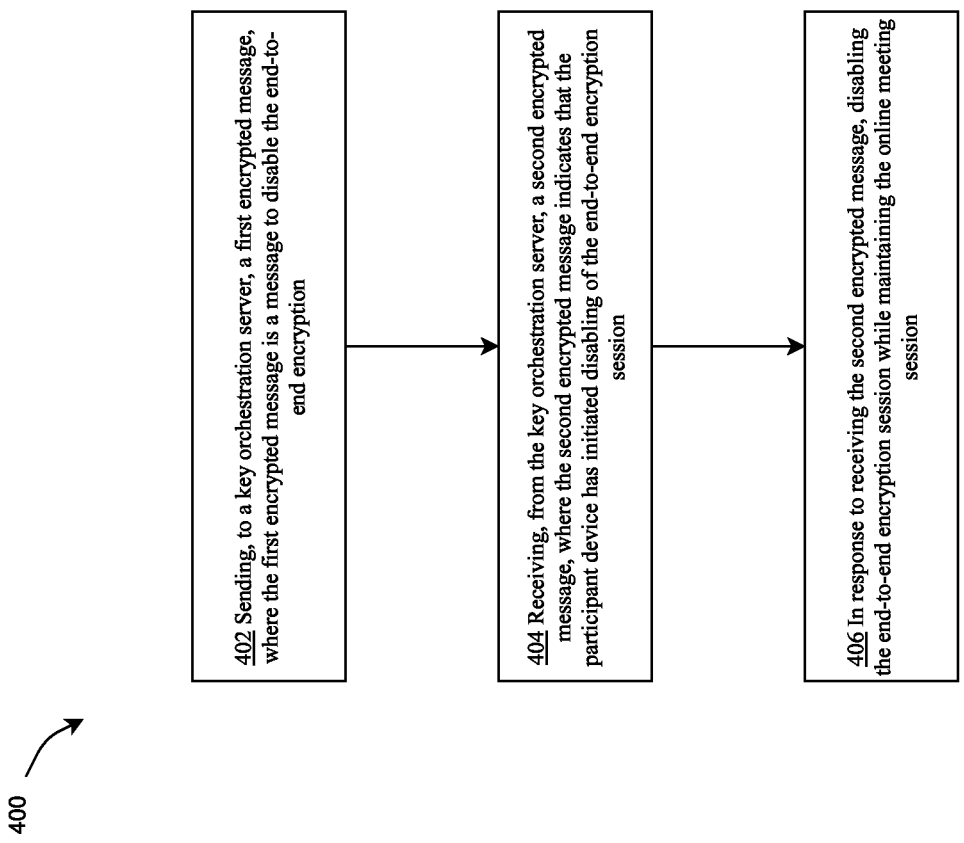
FIG. 4 is a flowchart depicting disabling end-to-end encryption for an online meeting session, in an example embodiment.

FIG. 4 depicts a flowchart for disabling end-to-end encryption for an online meeting session. Process 400 may be performed by a single program or multiple programs. The steps of the process as shown in FIG. 4 may be implemented using processor-executable instructions that are stored in computer memory. For the purposes of providing a clear example, the steps of FIG. 4 are described as being performed by computer programs executing on participant device 110-A. For the purposes of clarity process 400 is described in terms of a single entity.

In an embodiment, FIG. 4 depicts an online meeting session in which end-to-end encryption is enabled. The online meeting session may be between two participants using participant device 110-A and participant device 110-B. Communication of encrypted data may be sent between participant devices 110-A and 110-B using the meeting server 120. The key orchestration server 130 is used to track and maintain a group ID for the online meeting, participant IDs for the participants, participant device IDs for the participant devices 110-A and 110-B, UserInitKeys for the participants, and connection information for the participant devices 110-A and 110-B.

At step 402, process 400 sends to the key orchestration server 130 a first encrypted message, where the first encrypted message is a message to disable the end-to-end encryption. In an embodiment, participant device 110-A sends an encrypted message, such as an Application Message, to the key orchestration server 130. By sending an encrypted message, only the intended recipient will be able to know that the encrypted message is a message to disable end-to-end encryption. That is, the key orchestration server 130 is unaware of the request to disable end-to-end encryption. By using an encrypted message, unauthorized users are unable to intercept and interpret encrypted messages to disable end-to-end encryption, thereby reducing the security threat of an unauthorized participant either intercepting, forging, or spoofing end-to-end encryption disable messages.

In an embodiment, the encrypted message sent by participant device 110-A to the key orchestration server 130 is an encrypted message intended for the other participants in the online meeting. Using the above example, the encrypted message would be routed to the other participant, participant device 110-B. The key orchestration server 130 may receive the encrypted message from participant device 110-A and route the encrypted message to participant device 110-B using the connection information managed by the key orchestration service 332.

In an embodiment, prior to sending the first encrypted message to the key orchestration server 130, the client messaging service 110-A may determine whether the participant using participant device 110-A has the necessary permissions to disable the end-to-end encryption session in the online meeting. In one example, only host participants may be authorized to send encrypted messages to disable end-to-end encryption. Host participants may be participants of the online meeting that have elevated privileges such as being able to start and stop the online meeting, admit other participants into the online meeting, and perform other administrative tasks such as enabling/disabling end-to-end encryption, enabling/disabling a meeting recording, granting sharing capabilities, and moderating chat and sharing functionality. If the participant using participant device 110-A has the necessary permissions, then the client messaging service 114-A may generate the first encrypted message to disable end-to-end encryption and send the first encrypted message to the key orchestration server 130. If, however, the participant using participant device 110-A does not have the necessary permissions, then participant using participant device 110-A would not have the capability to send the first encrypted message to the key orchestration server 130. For instance, sending the first encrypted message to disable end-to-end encryption may be triggered by selecting an end-to-end encryption toggle button in graphical user interface of the participant application 112-A. If the participant of participant device 110-A does not have the necessary permissions to disable end-to-end encryption, then the end-to-end encryption toggle button may be disabled or removed from graphical user interface of the participant application 112-A.

At step 404, process 400 receives from the key orchestration server 130, a second encrypted message, where the second encrypted message indicates that the participant has initiated disabling of the end-to-end encryption session. In an embodiment, the second encrypted message received is an encrypted message that originated from the participant using participant device 110-B. The second encrypted message indicates that client messaging service 114-B has initiated disabling of end-to-end encryption on participant device 110-B. Since encryption and decryption for end-to-end encryption is performed at participant devices 110-A and 110-B, the process of disabling end-to-end encryption occurs at the client messaging services 114-A and 114-B. The key orchestration server 130 is used to route the second encrypted message without knowing the contents of the second encrypted message.

At step 406, process 400, in response to receiving the second encrypted message, disables the end-to-end encryption session while maintaining the online meeting session. In an embodiment, the client messaging service 114-A receives the second encrypted message, decrypts the second encrypted message, and analyzes the contents of the second encrypted message to determine that the other participant (participant device 110-B) is disabling encryption. In response, the client messaging service 114-A disables the end-to-end encryption session.

In an embodiment, disabling end-to-end encryption for the online meeting involves notifying the meeting server 120 and the key orchestration server 130. The meeting server 120 may receive a message from participant device 110-A to disable end-to-end encryption. Disabling end-to-end encryption on the meeting server 120 may involve a series of process steps to change where meeting data is stored. For example, the meeting server may store encrypted data from the end-to-end encryption session on meeting database 124. When the end-to-end encryption session is disabled, while the online meeting is still occurring, the meeting server 120 may start to store unencrypted meeting data in another location, such as meeting database 122. In other embodiments, storage of meeting data, whether encrypted or unencrypted, may be located on the same storage device but stored in separate folders, or separate database tables.

The key orchestration server 130, upon disabling end-to-end encryption, may remove participant data associated with the meeting group ID, including but not limited to, participant IDs, participant device IDs, UserInitKeys, and connection information. If, during the current online meeting session the participant using participant device 110-A intends to re-enable end-to-end encryption, the client messaging service 114-A would have to reestablish a new connection to the key orchestration server 130. Details for enabling end-to-end encryption are described in the 4.3 ENABLING END-TO-END ENCRYPTION section herein.

In an embodiment, prior to disabling end-to-end encryption, participant device 110-A may wait for a period of time to allow for the other participants to successfully disable end-to-end encryption on their corresponding participant devices. The period of time may be 1-2 seconds, or a greater or lesser period of time. Since disabling end-to-end encryption involves disconnecting participant device 110-A's connection to the key orchestration server 130, by waiting for a period of time the participant device 110-A ensures that other participant devices are not left communicating in an encrypted mode while participant device 110-A is communicating in an unencrypted mode.

In an embodiment, during the period of time that participant device 110-A is waiting to disable end-to-end encryption, participant device 110-A may begin to send unencrypted messages to the other participant devices, which may already be in an unencrypted mode, in order to ensure that the other participant devices are able to receive and read the unencrypted messages.

In another embodiment, prior to disabling end-to-end encryption, participant device 110-A may check whether the other participant devices have successfully disabled end-to-end encryption by sending encrypted test messages to the other participant devices. If the other participant devices respond to the test message, then that would mean that the other participant devices have not yet disabled end-to-end encryption. Alternatively, participant device 110-A may send an unencrypted test messages, expecting acknowledgements from the other participant devices that have successfully disabled end-to-end encryption. Once participant device 110-A has confirmed that the other participant devices have disabled end-to-end encryption, participant device 110-A may disable end-to-end encryption.

Figure 5:
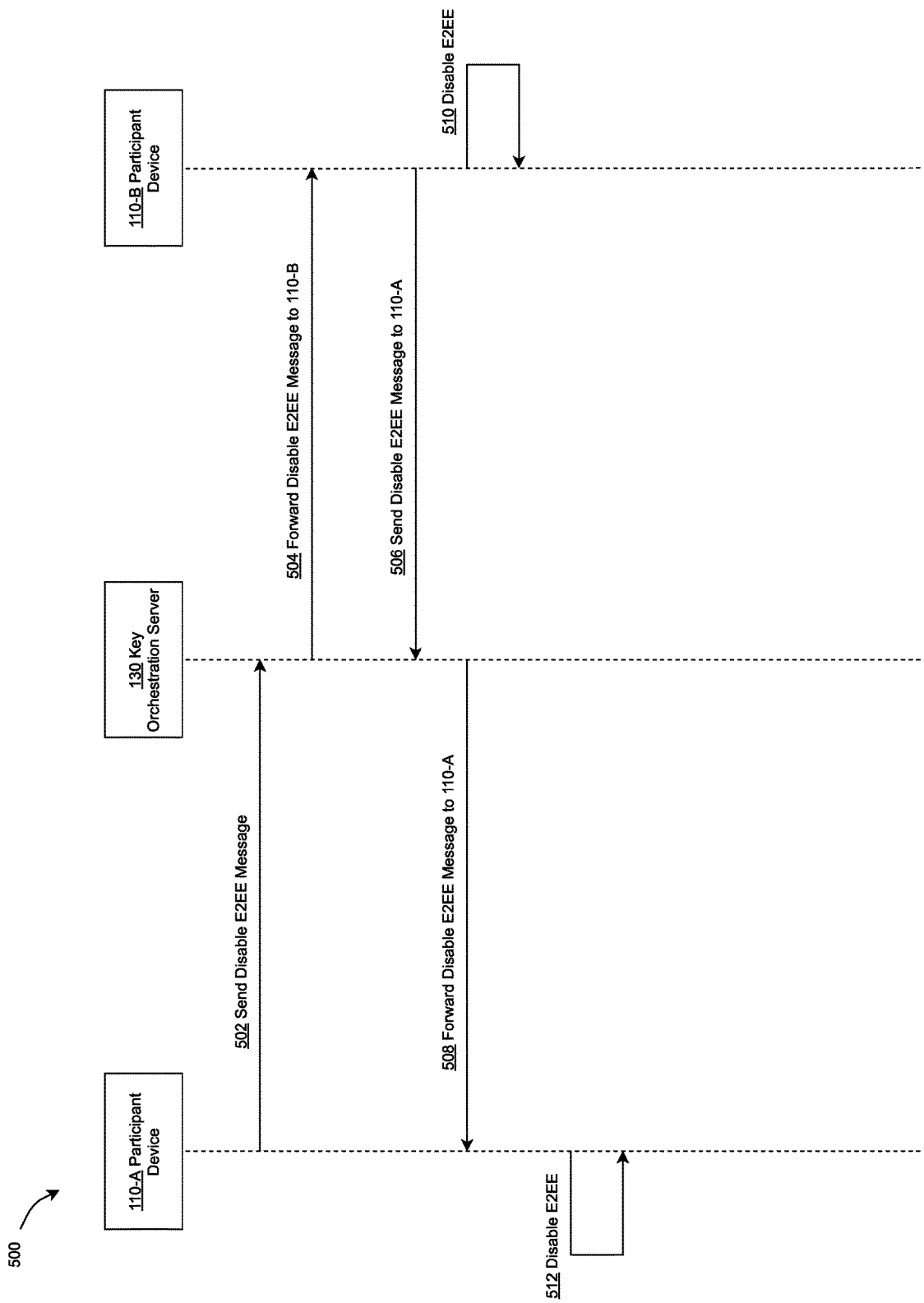
FIG. 5 is an example depicting a process for disabling end-to-end encryption for an online meeting system.

FIG. 5 is an example diagram depicting the process for disabling end-to-end encryption for an online meeting system. Process 500 may be performed by a single program or multiple programs. The steps of the process as shown in FIG. 5 may be implemented using processor-executable instructions that are stored in computer memory. In this example diagram, participant device 110-A and participant device 110-B are engaged in an online meeting in which end-to-end encryption is enabled. Both participant device 110-A and participant device 110-B are connected to the key orchestration server 130. For the purposes of clarity in FIG. 5 and subsequent figures, the term "E2EE" refers to "end-to-end encryption".

At step 502, process 500 sends a first encrypted message to the key orchestration server 130. In an embodiment, the participant device 110-A sends an encrypted message, such as an Application Message, to the key orchestration server 130. The contents of the encrypted message inform the other participant devices to disable end-to-end encryption.

At step 504, process 500 forwards the first encrypted message to participant device 110-B. In an embodiment, the key orchestration server 130, upon receiving the encrypted message, distributes the encrypted message to the other participant device, participant device 110-B. Since the key orchestration server 130 does not store any private keys for participant devices, the key orchestration server 130 does not have the ability to decrypt and read the encrypted message to determine that the participant device 110-A intends to disable end-to-end encryption.

At step 506, process 500 sends a second encrypted message for participant device 110-A back to the key orchestration server 130. In an embodiment, the participant device 110-B sends the second encrypted message back to the key orchestration server 130. The contents of the encrypted message sent back to the key orchestration server 130 indicates that the participant device 110-B is initiated the process to disable end-to-end encryption in the client messaging service 114-B. The key orchestration server 130 is unable to read contents of the encrypted message from the participant device 110-B.

At step 508, process 500 forwards the second encrypted message from participant device 110-B to participant device 110-A. In an embodiment, the key orchestration server 130, upon receiving the second encrypted message, distributes the second encrypted message to participant device 110-A.

At step 510, process 500 disables end-to-end encryption at participant device 110-B. In an embodiment, client messaging service 114-B disables end-to-end encryption on participant device 110-B. This step may occur immediately after step 506, concurrently with step 506, or before step 506.

At step 512, process 500 disables end-to-end encryption at participant device 110-A. In an embodiment, upon receiving the second encrypted message from the key orchestration server 130, the client messaging service 114-A decrypts the encrypted message and determines that participant device 110-B is disabling end-to-end encryption. In response, client messaging service 114-A disables end-to-end encryption on participant device 110-A. In an embodiment, client messaging service 114-A may delay disabling end-to-end encryption for a period of time, e.g., 2 seconds, in order to ensure that the other participant devices have successfully disabled end-to-end encryption on their end.

Upon disabling end-to-end encryption on both participant devices 110-A and 110-B, participant devices 110-A and 110-B would continue the online meeting in an unencrypted state.

4.2 Disabling End-to-End Encryption with Three or More Participant Devices

Figure 6:
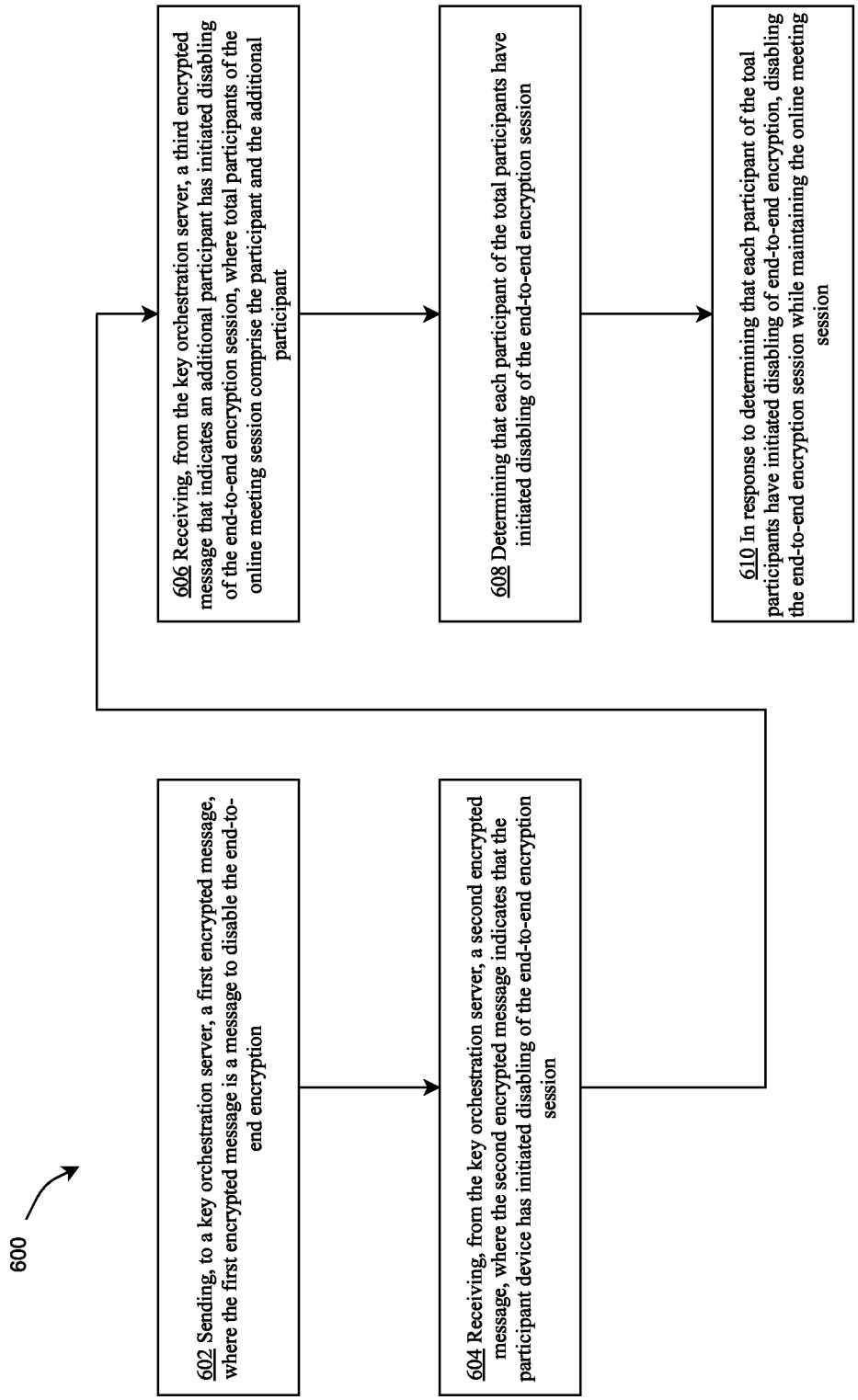
FIG. 6 is a flowchart depicting disabling end-to-end encryption for an online meeting session in which there are three or more participants, in an example embodiment.

FIG. 6 depicts a flowchart for disabling end-to-end encryption for an online meeting session in which there are three or more participants. Process 600 may be performed by a single program or multiple programs. The steps of the process as shown in FIG. 6 may be implemented using processor-executable instructions that are stored in computer memory. For the purposes of providing a clear example, the steps of FIG. 6 are described as being performed by computer programs executing on participant device 110-A. For the purposes of clarity process 600 is described in terms of a single entity.

In an embodiment, FIG. 6 depicts an online meeting session in which end-to-end encryption is enabled. The online meeting session may be between four participants using participant device 110-A, participant device 110-B, participant device 110-C, and participant device 110-D. Communication of encrypted data may be sent between participant devices 110-A, 110-B, 110-C, 110-D using the meeting server 120. The key orchestration server 130 is used to track and maintain a group ID for the online meeting, participant IDs for the participants, participant device IDs for the participant devices 110-A, 110-B, 110-C, and 110-D UserInitKeys for the participants, and connection information for the participant devices 110-A, 110-B, 110-C, and 110-D.

At step 602, process 600 sends to the key orchestration server 130 a first encrypted message, where the first encrypted message is a message to disable the end-to-end encryption. In an embodiment, participant device 110-A sends an encrypted message, such as an Application Message, to the key orchestration server 130. The key orchestration server 130 may receive the first encrypted message from participant device 110-A and route the first encrypted message to the other participant devices 110-B, 110-C, and 110-D using the connection information managed by the key orchestration service 332.

At step 604, process 600 receives from the key orchestration server 130 a second encrypted message, where the second encrypted message indicates that the participant has initiated disabling of the end-to-end encryption session. In an embodiment, the second encrypted message received is an encrypted message that originated from the participant using participant device 110-B. The second encrypted message indicates that client messaging service 114-B has initiated disabling of end-to-end encryption on participant device 110-B. Since encryption and decryption for end-to-end encryption is performed at participant devices 110-A, 110-B, 110-C, and 110-D, the process of disabling end-to-end encryption occurs at the client messaging services 114-A, 114-B, 114-C, and 114-D. The key orchestration server 130 is used to route the second encrypted message without knowing the contents of the second encrypted message.

At step 606, process 600 receives from the key orchestration server 130 a third encrypted message that indicates an additional participant has initiated disabling of the end-to-end encryption session, where the total participants of the online meeting session comprise the participant and the additional participant. In an embodiment, the third encrypted message received is an encrypted message that may have originated from one or more of the remaining participants, participant devices 110-C and 110-D. The third encrypted message indicates that at least one of client messaging services 114-C and 114-D has initiated disabling of end-to-end encryption.

At step 608, process 600 determines that each participant of the total participants have initiated disabling of the end-to-end encryption session. In an embodiment, the client messaging service 114-A on participant device 110-A may wait until it has received encrypted messages from each of the other participants before disabling end-to-end encryption on the client messaging service 114-A. If the client messaging service 114-A has received encrypted message from each participant, via the key orchestration server 130, and determined that each participant has initiated disabling of end-to-end encryption, then process 600 may proceed to step 610 to disable end-to-end encryption on participant device 110-A.

If, however, the client messaging service 114-A has not received an encrypted message from each participant, the client messaging service 114-A may wait for a period of time to receive any additional encrypted messages. For example, client messaging service 114-A may wait for additional messages before timing out. The timeout period may be configurable period of time based on prior encrypted message receiving duration history or any other historical metric. If after the timeout period, no additional encrypted message are received, process 600 may proceed to step 610 to disable end-to-end encryption on participant device 110-A.

At step 610, process 600 disables the end-to-end encryption session while maintaining the online meeting session.

Figure 7:
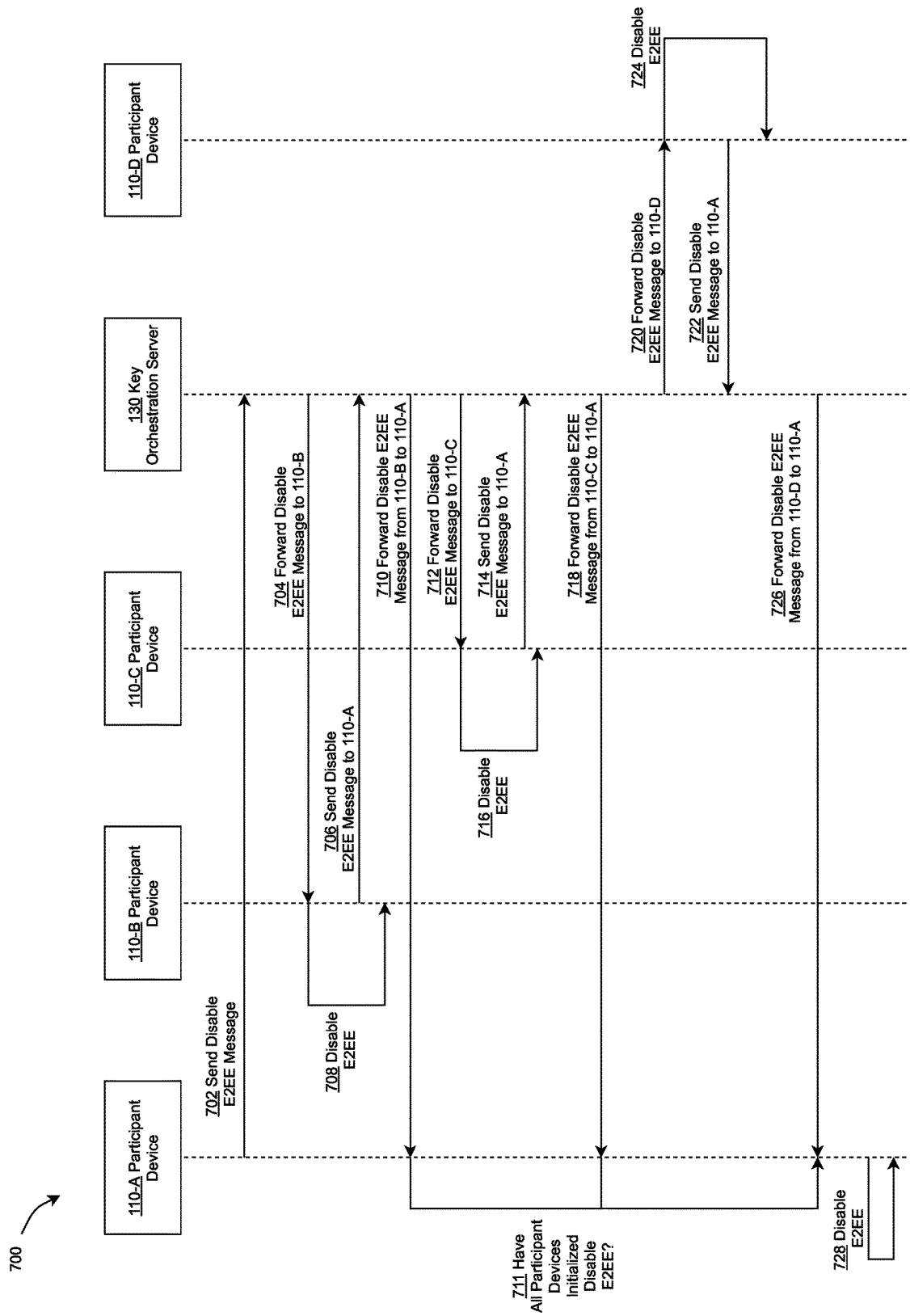
FIG. 7 is an example depicting a process for disabling end-to-end encryption for an online meeting session in which there are three or more participants, in an example embodiment.

FIG. 7 is an example diagram depicting the process for disabling end-to-end encryption for an online meeting session in which there are three or more participants. Process 700 may be performed by a single program or multiple programs. The steps of the process as shown in FIG. 7 may be implemented using processor-executable instructions that are stored in computer memory. In this example diagram, participant devices 110-A, 110-B, 110-C, and 110-D are engaged in an online meeting in which end-to-end encryption is enabled. Participant devices 110-A, 110-B, 110-C, and 110-D are connected to the key orchestration server 130.

At step 702, process 700 sends a first encrypted message to the key orchestration server 130. In an embodiment, the participant device 110-A sends an encrypted message, such as an Application Message, to the key orchestration server 130. The contents of the encrypted message inform the other participant devices 110-B, 110-C, and 110-D to disable end-to-end encryption.

At step 704, process 700 forwards the first encrypted message to participant device 110-B. In an embodiment, the key orchestration server 130, upon receiving the first encrypted message, distributes the first encrypted message to the other participant devices, participant devices 110-B, 110-C, and 110-D. FIG. 7 depicts steps 704, 712, and 720 as steps where the key orchestration server 130 forwards the first encrypted message from participant device 110-A to the other participant devices 110-B, 110-C, and 110-D. For the purposes of clarity, steps 704, 712, and 720 are shown in a specific order however, each of these steps may occur concurrently or in any order.

At step 706, process 700 sends an encrypted message for participant device 110-A back to the key orchestration server 130. In an embodiment, the participant device 110-B sends the encrypted message back to the key orchestration server 130. The contents of the encrypted message sent back to the key orchestration server 130 indicate that the participant device 110-B is initiating the process to disable end-to-end encryption in the client messaging service 114-B.

At step 708, process 700 disables end-to-end encryption at participant device 110-B. In an embodiment, client messaging service 114-B disables end-to-end encryption on participant device 110-B. This step may occur concurrently with step 706, before step 706, or after step 706.

At step 710, process 700 forwards the encrypted message from participant device 110-B to participant device 110-A. In an embodiment, the key orchestration server 130, upon receiving the encrypted message, distributes the encrypted Application Message to participant device 110-A.

At step 711, process 700 determines whether each of the participant devices have initialized disabling of end-to-end encryption. In an embodiment, the client messaging service 114-A polls for incoming messages to determine whether it has received encrypted messages from each participant device indicating that the other participant devices 110-B, 110-C, and 110-D have started to disable end-to-end encryption. If the other participant devices 110-B, 110-C, and 110-D have started to disable end-to-end encryption, then participant device 110-A may proceed to disable end-to-end encryption (step 730). If, however, participant device 110-A has not yet received encrypted message from each participant device, then participant device 110-A may wait for a period of time to receive the remaining messages.

Referring back to step 712, process 700 forwards the first encrypted message, from participant device 110-A to participant device 110-C. In an embodiment, the key orchestration server 130, upon receiving the encrypted message from participant device 110-A, distributes the encrypted message to one of the other participant devices, participant device 110-C.

At step 714, process 700, sends an encrypted message for participant device 110-A back to the key orchestration server 130. In an embodiment, the participant device 110-C sends the encrypted message back to the key orchestration server 130. The contents of the encrypted message sent back to the key orchestration server 130 indicate that the participant device 110-C is initiating the process to disable end-to-end encryption in the client messaging service 114-C.

At step 716, process 700 disables end-to-end encryption at participant device 110-C. In an embodiment, client messaging service 114-C disables end-to-end encryption on participant device 110-C. This step may occur concurrently with step 714, before step 714, or after step 714.

At step 718, process 700 forwards the encrypted message from participant device 110-C to participant device 110-A. In an embodiment, the key orchestration server 130, upon receiving the encrypted message from participant device 110-C, distributes the encrypted message to participant device 110-A.

Referring back to step 711, process 700 determines whether each of the participant devices have initialized disabling of end-to-end encryption. In an embodiment, the client messaging service 114-A polls for incoming messages to determine whether it has received encrypted message from each participant device indicating that the other participant devices 110-B, 110-C, and 110-D have started to disable end-to-end encryption.

If after a configured period of time, participant device 110-A has not yet received encrypted messages indicating that each of the participant devices have initiated disabling of end-to-end encryption, participant device 110-A may proceed directly to step 728 to disable end-to-end encryption. This may occur if one or more participant devices are unexpectedly disconnected from either the end-to-end encryption session or from the online meeting session. For example, participant device 110-D may crash and may be unable to send or receive encrypted messages. By disabling the end-to-end encryption session, any participant devices that were unexpectedly disconnected from the online meeting, may reconnect to the meeting server 120 and may receive unencrypted communications from the other participant devices who successfully disabled end-to-end encryption.

Referring back to step 720, process 700 forwards the first encrypted message, from participant device 110-A to participant device 110-D. In an embodiment, the key orchestration server 130, upon receiving the encrypted message from participant device 110-A, distributes the encrypted message to one of the other participant devices, participant device 110-D.

At step 722, process 700, sends an encrypted message for participant device 110-A back to the key orchestration server 130. In an embodiment, the participant device 110-D sends the encrypted message back to the key orchestration server 130. The contents of the encrypted message sent back to the key orchestration server 130 indicate that the participant device 110-D is initiating the process to disable end-to-end encryption in the client messaging service 114-D.

At step 724, process 700 disables end-to-end encryption at participant device 110-D. In an embodiment, client messaging service 114-D disables end-to-end encryption on participant device 110-D. This step may occur concurrently with step 722, before step 722, or after step 722.

At step 726, process 700 forwards the encrypted message from participant device 110-D to participant device 110-A. In an embodiment, the key orchestration server 130, upon receiving the encrypted message from participant device 110-D, distributes the encrypted message to participant device 110-A.

At step 711, process 700 determines whether each of the participant devices have initialized disabling of end-to-end encryption. In an embodiment, participant device 110-A has received encrypted message from each of the participant devices 110-B, 110-C, and 110-D, indicating that the participant devices 110-B, 110-C, and 110-D have all initiated disabling of end-to-end encryption.

At step 728, process 700 disables end-to-end encryption at participant device 110-A. In an embodiment, client messaging service 114-A may delay disabling end-to-end encryption for a period of time, such as 2 seconds, in order to ensure that the other participant devices have successfully disabled end-to-end encryption on their end.

4.3 Enabling End-to-End Encryption

Figure 9:
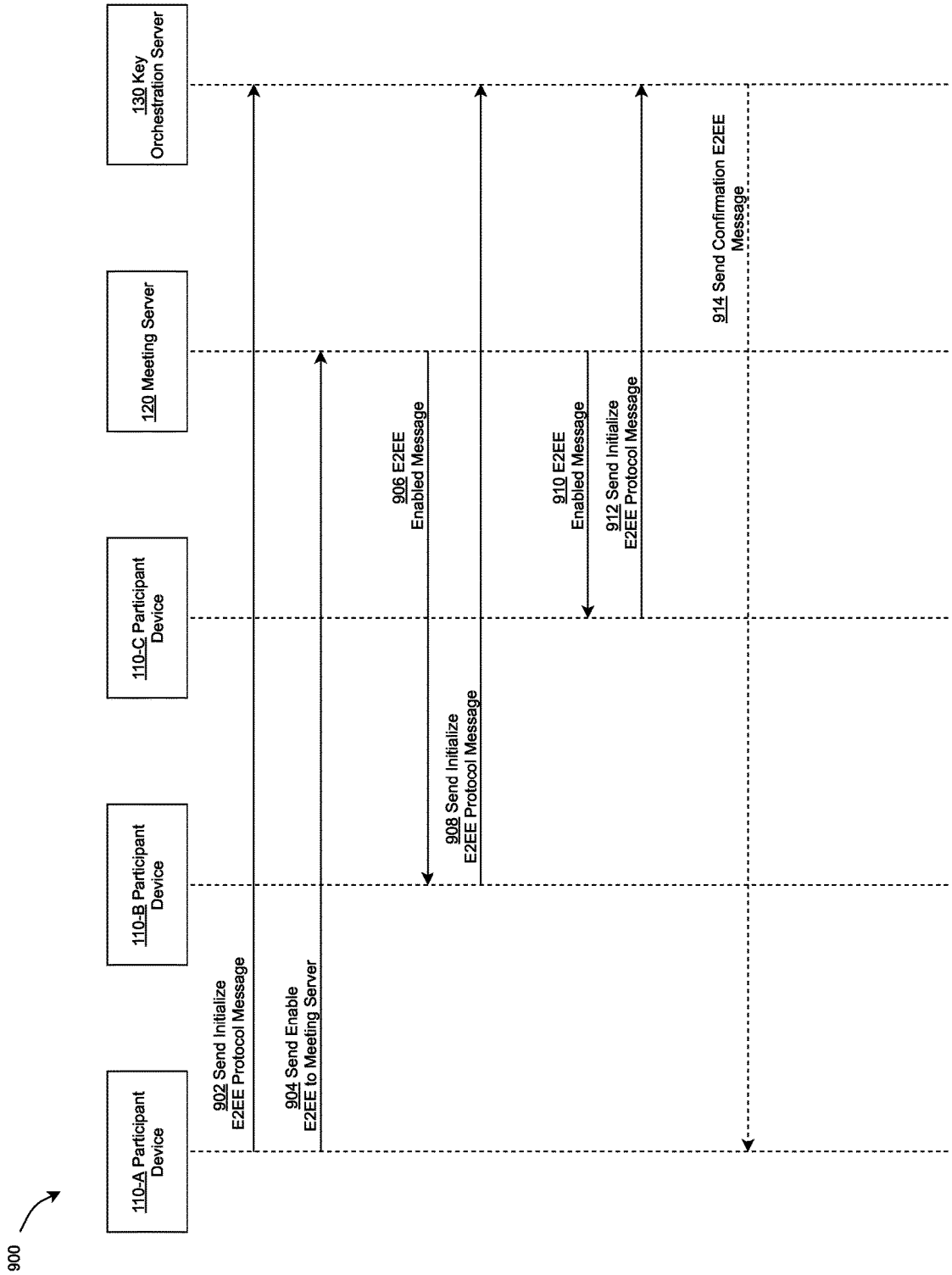
FIG. 9 is an example depicting a process for enabling end-to-end encryption for an online meeting session, in an example embodiment.

FIG. 9 is an example diagram depicting the process for enabling end-to-end encryption for an online meeting session. Process 900 may be performed by a single program or multiple programs. The steps of the process as shown in FIG. 9 may be implemented using processor-executable instructions that are stored in computer memory. In this example diagram, participant devices 110-A, 110-B, and 110-C are engaged in an online meeting session in which end-to-end encryption is not enabled. Participant devices 110-A, 110-B, and 110-C are connected to the meeting server 120 and the key orchestration server 130.

At step 902, process 900 sends an initialize end-to-end protocol message to the key orchestration server 130. In an embodiment, the participant device 110-A sends an initialization message to set up a new end-to-end encryption session between participant devices 110-A, 110-B, and 110-C. The new end-to-end encryption session may use an existing group ID for the new end-to-end encryption session, where the existing group ID is a group ID previously associated with the current online meeting and may have been used for prior end-to-end encryption sessions that may have occurred during the current meeting. If there was no prior end-to-end encryption session during the online meeting session, then a new group ID may be generated. The key orchestration server 130, upon receiving the initialize end-to-end protocol message, may begin to store participant IDs, participant device IDs, UserInitKeys, and connection information for each of the participants invited to join the new end-to-end encryption session.

At step 904, process 900 sends an enable end-to-end encryption message to the meeting server 120. In an embodiment, participant device 110-A sends the enable end-to-end encryption message sent to the meeting server 120, which may cause the meeting server 120 to switch locations of where meeting files are stored. For example, when the online meeting session is unencrypted, the meeting data may be stored in meeting database 122. When the online meeting session switches to an end-to-end encrypted session, the meeting data may be stored in meeting database 124.

At step 906, process 900 sends an end-to-end encryption meeting notification message to participant device 110-B. In an embodiment, the meeting server 120 may send the end-to-end encryption meeting notification message to participant device 110-B to inform participant device 110-B to begin initialization of the end-to-end encryption session.

At step 908, process 900 sends an initialize end-to-end protocol message to the key orchestration server 130. In an embodiment, the participant device 110-B sends the initialization message to the key orchestration server 130 to join the new end-to-end encryption session initiated by participant device 110-A.

At step 910, process 900 sends an end-to-end encryption meeting notification message to participant device 110-C. In an embodiment, the meeting server 120 may send the end-to-end encryption meeting notification message to participant device 110-C to inform participant device 110-C to begin initialization of the end-to-end encryption session.

At step 912, process 900 sends an initialize end-to-end protocol message to the key orchestration server 130. In an embodiment, the participant device 110-C sends the initialization message to the key orchestration server 130 to join the new end-to-end encryption session initiated by participant device 110-A.

At optional step 914, process 900 sends an end-to-end protocol confirmation message to participant device 110-A. In an embodiment, the key orchestration server 130 sends the end-to-end protocol confirmation message to participant device 110-A that confirms that the other participants have enabled end-to-end encryption. For example, the end-to-end protocol confirmation message may include a list of all participants devices who have enabled end-to-end encryption. In other embodiments, the confirmation message from the key orchestration server 130 to the participant device 110-A is not necessary. For example, participant device 110-A may receive subsequent encrypted messages from the key orchestration server 130 that include public keys for the remaining participant devices that have initiated the end-to-end encryption session, where the subsequent encrypted messages may be used as a confirmation that remaining participant devices have enabled end-to-end encryption.

Once participant devices 110-A, 110-B, and 110-C initialize the end-to-end encryption session, the key orchestration server 130 may distribute public keys for each participant device to each of the participant devices so that the participant devices may begin communicating using end-to-end encryption.

If a particular participant is engaged in the online meeting session but does not have a participant device that is capable of encrypting and decrypting end-to-end encryption messages, then the particular participant would not be able to join the end-to-end encryption session. In an embodiment, the key orchestration server 130 may notify participant device 110-A that the particular participant cannot join the end-to-end encryption session. The participant application 112-A may be configured to prompt its participant with an option to send an unencrypted message, to the particular participant, providing the particular participant with instructions to rejoin the online meeting with an end-to-end encryption enabled participant device. For example, if the particular participant joins the online meeting with using a dial-in telephone, then the particular participant would not be able to join the end-to-end encryption session. In response, participant device 110-A may send a text message to the particular participant with a link to join the online meeting using a third-party meeting application that is enabled with end-to-end encryption.

Alternatively, if the particular participant does not have access to an end-to-end encryption enabled participant device, then participant application 112-A may be configured to move the particular participant that cannot join the end-to-end encryption session into a separate breakout room or waiting room where the particular participant may still be part of the online meeting session while the other participants engage in the end-to-end encryption session. When the end-to-end encryption session ends, the particular participant may be moved out of the breakout room or waiting room and back to the main meeting. In yet other examples, subsets of participants may be selectively sequestered in a waiting room while other participants engage in the end-to-end encryption session. For instance, if the end-to-end encryption session is meant for executives to discuss sensitive matters while other employees wait, then the end-to-end encryption session may be configured to allow only executives into the session while all other participants are placed into the waiting room.

5.0 Authorization to Enable/Disable End-to-End Encryption

In an embodiment, only a subset of the participants of the online meeting have permissions to enable and disable end-to-end encryption during the online meeting. For example, permissions to enable and disable end-to-end encryption may only be granted to meeting hosts. If the participant using participant device 110-A is the meeting host, then only participant device 110-A may have the ability to enable and disable end-to-end encryption.

Figure 8:
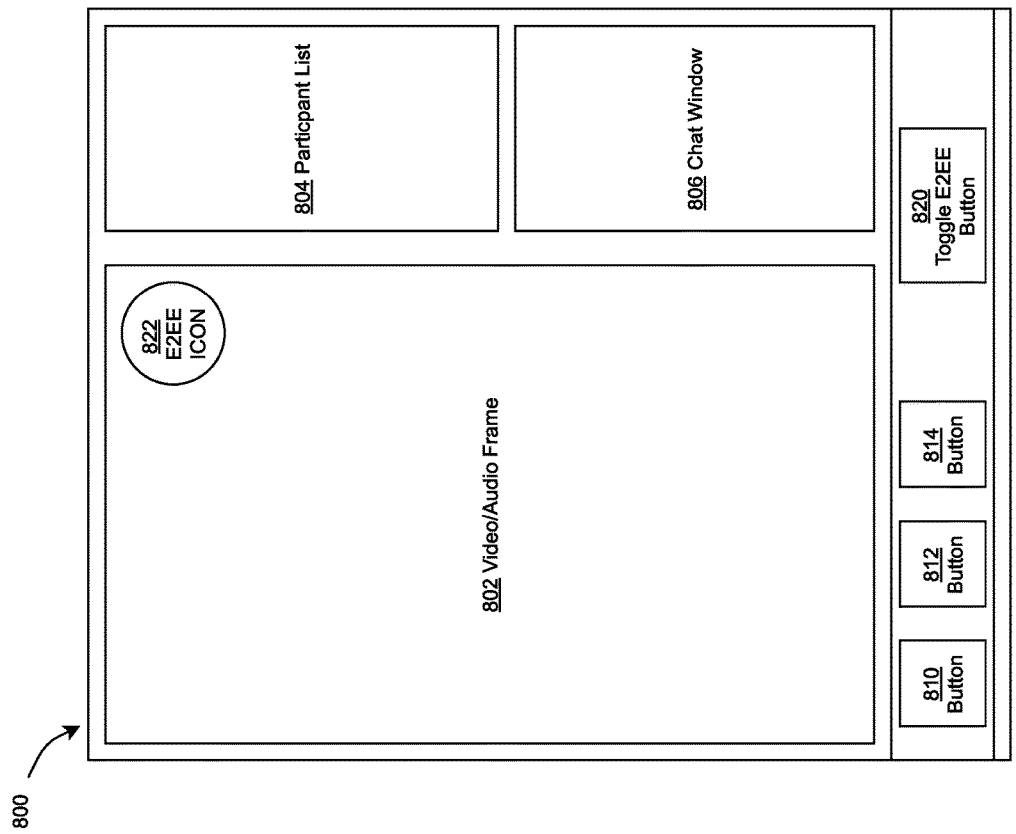
FIG. 8 depicts an example of a graphical user interface for engaging in the online meeting session, in an example embodiment.

FIG. 8 depicts an example embodiment of a graphical user interface for engaging in the online meeting session. Graphical user interface 800 represents an example graphical user interface generated by participant applications 112-A, 112-B, 112-C, and 112-D. Graphical user interface 800 may be presented within a web browser or as a standalone application. Video/audio frame 802 represents a window for presenting a video feed and/or an audio feed of the meeting. Participant list 804 may represent a window displaying a list of participants engaged in the meeting. Chat window 806 may represent a chat box where participants may post messages to other participants. Buttons 810, 812, and 814 may represent various meeting buttons used to perform standard online meeting actions such as mute, toggle video, share screen, and leave meeting.

Toggle E2EE button 820 represents a button used to enable and/or disable end-to-end encryption during the online meeting. In an embodiment, the toggle E2EE button 820 may only be displayed on participant devices authorized to enable and disable end-to-end encryption. For example, the toggle E2EE button 820 may only be enabled on participant device 110-A if the participant is the only meeting host. The other participant devices 110-B, 110-C, and 110-D may not show the toggle E2EE button 820, as they are not the meeting host. In another example, the toggle E2EE button 820 may be disabled, e.g., greyed out, on participant devices 110-B, 110-C, and 110-D, as they are not the meeting host.

In an embodiment, participant applications 112-A, 112-B, 112-C, and 112-D determine whether their corresponding participant is a meeting host by accessing the meeting details for the online meeting to determine which participants are designated as the meeting host. For example, participant applications 112-A, 112-B, 112-C, and 112-D may retrieve the meeting details from the meeting server 120. The meeting details may list the meeting host as the participant using participant device 110-A and participants using participant devices 110-B, 110-C, and 110-D as invited participants. As a result, the participant application 114-A may enable the toggle E2EE button 820, while participant applications 114-B, 114-C, and 114-D may disable the toggle E2EE button 820 from the graphical user interface 800.

E2EE icon 822 represents a visual icon that indicates whether end-to-end encryption is enabled or disabled. For example, the E2EE icon 822 may be displayed within graphical user interface 800 on each of the participant devices 110-A, 110-B, 110-C, and 110-D when end-to-end encryption is enabled. When end-to-end encryption is disabled, the E2EE icon 822 is not displayed to indicate to the participant that the online meeting session does not have end-to-end encryption enabled. In another example, when end-to-end encryption is disabled, a large "X" may be superimposed onto the E2EE icon 822 to clearly indicate that end-to-end encryption is disabled. In yet other embodiments, the E2EE icon 822 may display a different graphical icon to indicate that end-to-end encryption is disabled.

In an embodiment, when end-to-end encryption is enabled or disabled, participant applications 112-A, 112-B, 112-C, and 112-D may notify their participant of the change in encryption state with either an audible sound or visual notification. For example, participant application 112-A may play an audible sound that says "end-to-end encryption is disabled" when end-to-end encryption is disabled and play an audible sound that says "end-to-end encryption is enabled" when end-to-end encryption is enabled. Other sounds may be played to indicate a change in the encryption state include an audible ding, pop, or any other sound that may indicate a change in the encryption state. In another example, participant application 112-A may display a temporary pop-up notification to inform the participant that the encryption state has changed. In yet another example, the graphical user interface 800 may make a visual change to indicate that the online meeting is in either an encrypted or unencrypted state. For instance, graphical user interface 800 may add a colored border, such as a red border, to the graphical user interface 800 to inform the participant that the online meeting is unencrypted. In yet other examples, the graphical user interface 800 may display banner text that indicates that the meeting is unencrypted.

In an embodiment, participant devices 110-A, 110-B, 110-C, and 110-D may perform another level of authentication to ensure that the disable end-to-end encryption request received was sent by a participant authorized to disable end-to-end encryption. For example, if participant device 110-A is authorized to enable/disable end-to-end encryption and sends encrypted disable end-to-end encryption messages to each of the participant devices 110-B, 110-C, and 110-D, then each of the participant devices 110-B, 110-C, and 110-D, upon receiving the encrypted message, may identify the sender as participant device 110-A. Identification of participant device 110-A may be accomplished by verifying that the security certificate, within the encrypted message, maps to the participant using participant device 110-A. Then, each of the participant devices 110-B, 110-C, and 110-D may verify that the participant using participant device 110-A is listed as a meeting host by accessing the meeting details from the meeting server 120.

In an embodiment, participants authorized to toggle end-to-end encryption may have the ability to temporarily grant enable/disable access to other participants. For example, if participant device 110-A is authorized to enable/disable end-to-end encryption and participant device 110-A needs to leave the online meeting, then participant device 110-A may be able to temporarily authorize to another participant, such as participant device 110-B with enable/disable end-to-end encryption privileges. In an embodiment when participant device 110-A temporarily authorizes participant device 110-B to enable/disable end-to-end encryption, client messaging service 114-A may send an encrypted message to each of the other participant devices 110-B, 110-C, 110-D, via the key orchestration server 130. The encrypted message may instruct the participant applications 112-B, 112-C, and 112-D that participant device 110-B has authority to enable/disable end-to-end encryption, and participant application 112-B may enable the toggle E2EE button 820. In an embodiment, participant device 110-A may be able to revoke permissions to enable/disable end-to-end encryption from participant device 110-B.

Figure 10:
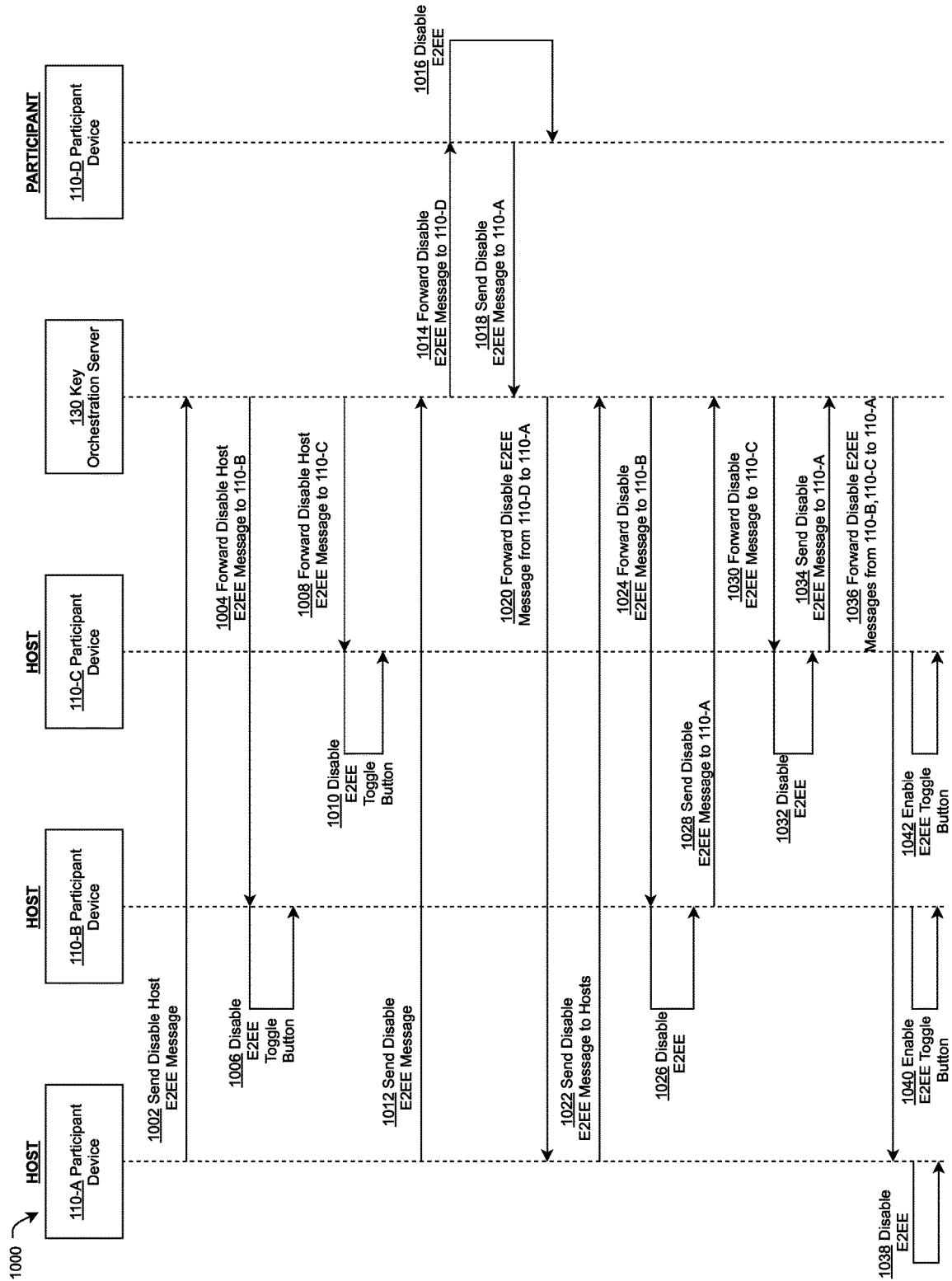
FIG. 10 is an example depicting a process of synchronizing the disabling of an end-to-end encryption session when there are multiple meeting hosts, in an example embodiment.

In an embodiment, if there are multiple meeting hosts that have enable/disable end-to-end encryption privileges for an online meeting, then each of their corresponding participant devices may need to be synchronized in order to ensure proper disabling and enabling of end-to-end encryption sessions. FIG. 10 depicts an example diagram for a process of synchronizing the disabling of an end-to-end encryption session when there are multiple meeting hosts. Process 1000 may be performed by a single program or multiple programs. The steps of the process as shown in FIG. 10 may be implemented using processor-executable instructions that are stored in computer memory. In this example diagram, participant devices 110-A, 110-B, 110-C, and 110-D are engaged in an online meeting in which end-to-end encryption is enabled. Participant devices 110-A, 110-B, 110-C are assigned as meeting hosts with privileges to enable/disable end-to-end encryption. Participant device 110-D is a participant and does not have privileges to enable/disable end-to-end encryption.

At step 1002, process 1000 sends an encrypted message to the key orchestration server 130. In an embodiment, participant device 110-A sends an encrypted message to the key orchestration server 130, where contents of the encrypted message inform the other hosts, participant devices 110-B and 110-C to disable their E2EE toggle button 820.

At step 1004, process 1000 forwards the encrypted message to participant device 110-B. In an embodiment, the key orchestration server 130, upon receiving the encrypted message, distributes the encrypted message to the other hosts, participant devices 110-B and 110-C. Step 1004 specifically illustrates distributing the encrypted message to participant device 110-B. FIG. 10 depicts steps 1004 and 1008 as steps where the key orchestration server 130 forwards the encrypted message from participant device 110-A to the other host participant devices 110-B and 110-C. For the purposes of clarity, steps 1004 and 1008 are shown in a specific order however, each of these steps may occur concurrently or in any order.

At step 1006, process 1000 disables the E2EE toggle button 820 on participant device 110-B. In an embodiment, client messaging service 114-B receives the encrypted message and causes participant application 112-B to disable the E2EE toggle button 820. The E2EE toggle button 820 is disabled whenever another host participant initiates a change to the state of the end-to-end encryption session.

At step 1008, process 1000 forwards the encrypted message to participant device 110-C. In an embodiment, the key orchestration server 130, upon receiving the encrypted message from participant device 110-A (at step 1002), distributes the encrypted message to the remaining participant device 110-C.

At step 1010, process 1000 disables the E2EE toggle button 820 on participant device 110-C. In an embodiment, client messaging service 114-C receives the encrypted message and causes participant application 112-C to disable the E2EE toggle button 820.

At step 1012, process 1000 sends an encrypted message to the key orchestration server 130. In an embodiment, the participant device 110-A sends an encrypted message to the key orchestration server 130. The contents of the encrypted message inform the other participant devices, which are not hosts, to disable end-to-end encryption. In FIG. 10, the only non-host participant device is participant device 110-D.

At step 1014, process 1000 forwards the encrypted message to the non-host participant device 110-D. In an embodiment, the key orchestration server 130, upon receiving the encrypted message, distributes the encrypted message to the non-host participant devices, participant device 110-D.

At step 1016, process 1000 disables end-to-end encryption at participant device 110-D. In an embodiment, client messaging service 114-D disables end-to-end encryption on participant device 110-D. This step may occur concurrently with step 1018, before step 1018, or after step 1018.

At step 1018, process 1000 sends an encrypted message for participant device 110-A back to the key orchestration server 130. In an embodiment, the participant device 110-D sends the encrypted message back to the key orchestration server 130. The contents of the encrypted message sent back to the key orchestration server 130 indicate that the participant device 110-D is initiating the process to disable end-to-end encryption in the client messaging service 114-D.

At step 1020, process 1000 forwards the encrypted message from participant device 110-D to participant device 110-A. In an embodiment, the key orchestration server 130, upon receiving the encrypted message, distributes the encrypted message to participant device 110-A.

Upon receiving encrypted messages from each of the non-host participant devices (participant device 110-D), participant device 110-A may inform the other host participant devices to initiate disabling of end-to-end encryption. At step 1022, process 1000 sends an encrypted message to the key orchestration server 130. In an embodiment, the participant device 110-A sends an encrypted message to the key orchestration server 130, where the contents of the encrypted message inform the other host participant devices, participant devices 110-B and 110-C, to disable end-to-end encryption.

At step 1024, process 1000 forwards the encrypted message to participant device 110-B. In an embodiment, the key orchestration server 130, upon receiving the encrypted message, distributes the encrypted message to the other host participant devices, which at this step is participant device 110-B. At step 1026, process 1000 disables end-to-end encryption at participant device 110-B. In an embodiment, client messaging service 114-B disables end-to-end encryption on participant device 110-B.

At step 1028, process 1000 sends an encrypted message for participant device 110-A back to the key orchestration server 130. In an embodiment, the participant device 110-B sends the encrypted message back to the key orchestration server 130. The contents of the encrypted message sent back to the key orchestration server 130 indicate that the participant device 110-B is initiating the process to disable end-to-end encryption in the client messaging service 114-B.

At step 1030, process 1000 forwards the encrypted message to participant device 110-C. In an embodiment, the key orchestration server 130 distributes the encrypted message to the other host participant device, which at this step is participant device 110-C. At step 1032, process 1000 disables end-to-end encryption at participant device 110-C. In an embodiment, client messaging service 114-C disables end-to-end encryption on participant device 110-C.

At step 1034, process 1000 sends an encrypted message for participant device 110-A back to the key orchestration server 130. In an embodiment, the participant device 110-C sends the encrypted message back to the key orchestration server 130. The contents of the encrypted message sent back to the key orchestration server 130 indicate that the participant device 110-C is initiating the process to disable end-to-end encryption in the client messaging service 114-C.

At step 1036, process 1000 forwards the encrypted messages from participant devices 110-B and 110-C to participant device 110-A. In an embodiment, the key orchestration server 130, upon receiving the encrypted messages from participant devices 110-B and 110-C, distributes the encrypted messages to participant device 110-A. FIG. 10 depicts forwarding of the encrypted messages to participant device 110-A as a single step however, the forwarding of the encrypted messages may be performed at different times. For example, the key orchestration server 130 may forward the encrypted message from participant device 110-B any time after step 1028. Similarly, the key orchestration server 130 may forward the encrypted message from participant device 110-C any time after step 1034.

Upon receiving encrypted messages indicating that the non-host participant device (participant device 110-D) and the host participant devices (participant devices 110-B and 110-C) have initiated the process to disable end-to-end encryption on their corresponding participant devices, process 1000 may proceed to step 1038. At step 1038, process 1000 disables end-to-end encryption at participant device 110-A. In an embodiment, client messaging service 114-A may delay disabling end-to-end encryption for a period of time, such as 2 seconds or any other configured period of time, in order to ensure that the other participant devices have successfully disabled end-to-end encryption on their end.

At step 1040, process 1000 enables the E2EE toggle button 820 on participant device 110-B. In an embodiment, participant application 112-B may delay enabling the E2EE toggle button 820 to ensure that the process of disabling end-to-end encryption is complete. For example, participant application 112-B may pause for 5 seconds before enabling the E2EE toggle button 820. The pause time may be configured to any period of time. The pause may be a longer period of time than the delay performed by participant device 110-A at step 1038. At step 1042, process 1000 enables the E2EE toggle button 820 on participant device 110-C. Similar to step 1040, participant application 112-C may delay enabling the E2EE toggle button 820 to ensure that disabling end-to-end encryption is complete.

What is claimed is:

1. A computer-implemented method for engaging in an online meeting session in which an end-to-end encryption session is enabled, the method comprising:
    determining that a first participant using a first participant device of multiple participant devices connected to the online meeting session has permission to disable end-to-end encryption;
    in response to determining that the first participant has the permission to disable end-to-end encryption, sending, by the first participant device to a key orchestration server, a first disable message to disable the end-to-end encryption session, wherein the first disable message is an encrypted message to disable the end-to-end encryption session;
    receiving, by the first participant device, a second encrypted message from the key orchestration server indicating that a second participant device, of the multiple participant devices, has initiated disabling of the end-to-end encryption session;
    wherein the second encrypted message originated from the second participant device; and
    in response to receiving the second encrypted message, disabling, by the first participant device, the end-to-end encryption session while maintaining the online meeting session.

2. The computer-implemented method of claim 1, wherein the online meeting session is hosted by a meeting server.

3. The computer-implemented method of claim 1, wherein the end-to-end encryption session is managed by key orchestration server, implemented to manage encryption keys for a plurality of participants of the end-to-end encryption session and to route encrypted messages between the plurality of participants.

4. The method of claim 1, wherein the key orchestration server uses Message Layer Security protocol for sending and receiving a plurality of encrypted messages.

5. The method of claim 1, wherein disabling the end-to-end encryption session, comprises:

receiving, from the key orchestration server, a third encrypted message that indicates an additional participant has initiated disabling of the end-to-end encryption session, wherein total participants of the online meeting session comprises the participant and the additional participant;

determining that each participant of the total participants have initiated disabling of the end-to-end encryption session; and in response to determining that each participant of the total participants have initiated disabling of the end-to-end encryption session, disabling, by the first participant device, the end-to-end encryption session while maintaining the online meeting session.

6. The method of claim 1, wherein disabling the end-to-end encryption session, comprises: receiving, from the key orchestration server, an additional third encrypted message that indicates an additional participant has initiated disabling of the end-to-end encryption session, wherein total participants of the online meeting session include the participant, the additional participant, and a particular participant;

waiting for a period of time to receive, from the key orchestration server, a fourth encrypted message indicating that the particular participant has initiated disabling of the end-to-end encryption session;

determining that the period of time has elapsed without receiving the fourth encrypted message; and in response to determining that the period of time has elapsed, disabling, by the first participant device, the end-to-end encryption session while maintaining the online meeting session.

7. The method of claim 1, wherein disabling the end-to-end encryption session, comprises:

in response to receiving the second encrypted message, waiting for a period of time; and at the end of the period of time, disabling, by the first participant device, the end-to-end encryption session while maintaining the online meeting session.

8. The method of claim 1, wherein the first disable message is a message to disable end-to-end encryption at each participant device of a plurality of participant devices.

9. The method of claim 1, further comprising:

sending, to a meeting server that is hosting the online meeting session, an unencrypted message to enable a second end-to-end encryption session; and sending, to the key orchestration server, an initialization message to initialize the second end-to-end encryption session to allow participants of the online meeting session to engage in the second end-to-end encryption session.

10. A non-transitory, computer-readable medium storing a set of instructions for engaging in an online meeting session in which an end-to-end encryption session is enabled, that, when executed by a processor, cause:

determining that a first participant using a first participant device of multiple participant devices connected to the online meeting session has permission to disable end-to-end encryption;

in response to determining that the first participant has the permission to disable end-to-end encryption, sending, by the first participant device to a key orchestration server, a first disable message to disable the end-to-end encryption session, wherein the first disable message is an encrypted message to disable the end-to-end encryption session;

receiving, by the first participant device, a second encrypted message from the key orchestration server indicating that a second participant device, of the multiple participant devices, has initiated disabling of the end-to-end encryption session;

wherein the second encrypted message originated from the second participant device; and in response to receiving the second encrypted message, disabling, by the first participant device, the end-to-end encryption session while maintaining the online meeting session.

11. The non-transitory, computer-readable medium of claim 10, wherein the key orchestration server uses Message Layer Security protocol for sending and receiving a plurality of encrypted messages.

12. The non-transitory, computer-readable medium of claim 10, wherein the non-transitory, computer-readable medium storing further instructions that, when executed by the processor, cause:

receiving, from the key orchestration server, a third encrypted message that indicates an additional participant has initiated disabling of the end-to-end encryption session, wherein total participants of the online meeting session comprise the participant and the additional participant;

determining that each participant of the total participants have initiated disabling of the end-to-end encryption session; and in response to determining that each participant of the total participants have initiated disabling of the end-to-end encryption session, disabling, by the first participant device, the end-to-end encryption session while maintaining the online meeting session.

13. The non-transitory, computer-readable medium of claim 10, wherein the first disable message is a message to disable end-to-end encryption at each participant device of a plurality of participant devices.

14. The non-transitory, computer-readable medium of claim 10, wherein the non-transitory, computer-readable medium storing further instructions that, when executed by the processor, cause:

sending, to a meeting server that is hosting the online meeting session, an unencrypted message to enable a second end-to-end encryption session; and sending, to the key orchestration server, an initialization message to initialize the second end-to-end encryption session to allow participants of the online meeting session to engage in the second end-to-end encryption session.

15. A network-based system for engaging in an online meeting session in which an end-to-end encryption session is enabled, the system comprising:

a processor;

a memory operatively connected to the processor and storing instructions that, when executed by the processor, cause:

determining that a first participant using a first participant device of multiple participant devices connected to the online meeting session has permission to disable end-to-end encryption;

in response to determining that the first participant has the permission to disable end-to-end encryption, sending, by the first participant device to a key orchestration server, a first disable message to disable the end-to-end encryption session, wherein the first disable message is an encrypted message to disable the end-to-end encryption session;

receiving, by the first participant device, a second encrypted message from the key orchestration server indicating that a second participant device, of the multiple participant devices, has initiated disabling of the end-to-end encryption session;

wherein the second encrypted message originated from the second participant device; and in response to receiving the second encrypted message, disabling, by the first participant device, the end-to-end encryption session while maintaining the online meeting session.

16. The system of claim 15, wherein the key orchestration server uses Message Layer Security protocol for sending and receiving a plurality of encrypted messages.

17. The system of claim 15, wherein the memory storing further instructions that, when executed by the processor, cause:

receiving, from the key orchestration server, a third encrypted message that indicates an additional participant has initiated disabling of the end-to-end encryption session, wherein total participants of the online meeting session comprise the participant and the additional participant; and determining that each participant of the total participants have initiated disabling of the end-to-end encryption session;

in response to determining that each participant of the total participants have initiated disabling, by the first participant device, of the end-to-end encryption session, disabling the end-to-end encryption session while maintaining the online meeting session.

18. The system of claim 15, wherein the first disable message is a message to disable end-to-end encryption at each participant device of a plurality of participant devices.

19. The system of claim 15, wherein the memory storing further instructions that, when executed by the processor, cause:

sending, to a meeting server that is hosting the online meeting session, an unencrypted message to enable a second end-to-end encryption session; and sending, to the key orchestration server, an initialization message to initialize the second end-to-end encryption session to allow participants of the online meeting session to engage in the second end-to-end encryption session.

* * * * *